US008577756B2

(12) United States Patent
Kumar et al.

(10) Patent No.: US 8,577,756 B2
(45) Date of Patent: Nov. 5, 2013

(54) METHOD, SYSTEM, AND COMPUTER PROGRAM PRODUCT FOR PROVIDING TRANSACTION SERVICES

(75) Inventors: Shiv Kumar, Marlboro, NJ (US); Paritosh Bajpay, Edison, NJ (US); Narendra Ravi, Howell, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 235 days.

(21) Appl. No.: 12/910,009

(22) Filed: Oct. 22, 2010

(65) Prior Publication Data
US 2012/0101914 A1 Apr. 26, 2012

(51) Int. Cl.
*G06Q 30/00* (2012.01)
(52) U.S. Cl.
USPC .................. 705/27.2; 705/27.1; 705/26.61
(58) Field of Classification Search
USPC ................................................ 705/26.1–27.2
See application file for complete search history.

(56) References Cited

U.S. PATENT DOCUMENTS 6,026,376 A * 2/2000 Kenney ..................... 705/26.61
2002/0038255 A1 * 3/2002 Tarvydas et al. ............. 705/26

OTHER PUBLICATIONS

Johnson, S. J. (1992). Retail systems: No longer business as usual. Journal of Systems Management, 43(8), 8-8.*

* cited by examiner

*Primary Examiner* — Resha Desai
(74) *Attorney, Agent, or Firm* — Cantor Colburn LLP (57) ABSTRACT

Transaction services include providing, to a computer system of an entity via a first user interface, a transaction service template having data fields configured to specify items and identifiers of physical locations in which each of the items resides. The transaction services also include receiving the transaction service template including entries presented in the data fields, the transaction service template mapping the items to corresponding physical locations. Transaction services further include providing a second user interface to an end user device, the second user interface including a portion of the data fields of the transaction service template. In response to a transaction request that includes one of the items, the transaction services also include populating an identifier of a corresponding physical location of the item in the transaction request within the second user interface as a transaction response.

20 Claims, 8 Drawing Sheets

| 600 | 602 | 604 | 606 | 608 | 610 | 612 |
|---|---|---|---|---|---|---|
| | QTY | ITEM | LOCATION | BRAND | PRICE | SALE |
| | 1 DZ | EGGS | AISLE 7 | XXX | $2.49 | NO |
| | 1 GAL | MILK | AISLE 7 | YYY | $3.99 | CUSTLOYL |
| | 1 GAL | LDET | AISLE 4 | ZZZ | $5.99 | NO |

SELECT

LEVEL ~702

DEPARTMENT ~704

706 BRAND

708 ON-SALE

SHOES
ELECTRONICS
CLOTHING
TOYS
...     ~710

METHOD, SYSTEM, AND COMPUTER PROGRAM PRODUCT FOR PROVIDING TRANSACTION SERVICES

BACKGROUND

Exemplary embodiments relate generally to communications, and more particularly, to providing transaction services to customers.

Today, many people utilize mobile devices, such as cellular telephones, smartphones, handheld devices, personal digital assistants (PDA), handsets, etc. The portability of these devices renders them quite useful in remote locations, or away from home. There are currently an ever-increasing number of applications created for these devices to assist customers in a number of useful activities ranging from online banking to social networking.

In many shopping malls and outlets, shoppers have a hard time locating items in-store and may not have desired access to item pricing and sale information. Most store aisles have static signs generally listing categories of items; however, in many instances a shopper needs to walk around discerning in which aisle a product may be found or seek the assistance of a store clerk. Likewise, store clerks are often too busy to fully assist customers in locating items, particularly during peak or busy shopping periods.

BRIEF SUMMARY

Exemplary embodiments include a method for providing transaction services. The method includes providing, to a computer system of an entity via a first user interface, a transaction service template having data fields configured to specify items and identifiers of physical locations in which each of the items resides. The method also includes receiving the transaction service template including entries presented in the data fields, the transaction service template mapping the items to corresponding physical locations. The method further includes providing a second user interface to an end user device, the second user interface including a portion of the data fields of the transaction service template. In response to a transaction request that includes one of the items, the method includes populating an identifier of a corresponding physical location of the item in the transaction request within the second user interface as a transaction response.

Additional exemplary embodiments include a system for providing transaction services. The system includes a host system computer and logic executable by the host system computer. The logic implements a method. The method includes providing, to an entity via a first user interface, a transaction service template having data fields configured to specify items and identifiers of physical locations in which each of the items resides. The method also includes receiving the transaction service template including entries presented in the data fields, the transaction service template mapping the items to corresponding physical locations. The method further includes providing a second user interface to an end user device, the second user interface including a portion of the data fields of the transaction service template. In response to a transaction request that includes one of the items, the method includes populating an identifier of a corresponding physical location of the item in the transaction request within the second user interface as a transaction response a wireless customer service server for providing wireless customer services.

Other systems, methods, and/or computer program products according to embodiments will be or become apparent to one with skill in the art upon review of the following drawings and detailed description. It is intended that all such additional systems, methods, and/or computer program products be included within this description, be within the scope of the exemplary embodiments, and be protected by the accompanying claims.

BRIEF DESCRIPTION OF DRAWINGS

Referring now to the drawings wherein like elements are numbered alike in the several FIGURES.

The detailed description explains exemplary embodiments, together with features, by way of example with reference to the drawings.

DETAILED DESCRIPTION OF EXEMPLARY EMBODIMENTS

Exemplary embodiments provide transaction services that enable the automation of various transactions. A transaction refers to an action or activity involving two or more parties or things that reciprocally affect or influence one another. In one embodiment, transactions may include monitoring and replenishing inventory items at a business enterprise. Items to be monitored may include, e.g., electrical equipment, manufacturing equipment, communications equipment, safety devices, and product inventory. Aspects to be monitored may include operational conditions/statuses, inventory statuses, and replenishment statuses of goods. In another embodiment, transactions may include creating a customized, detailed shopping list. In a further embodiment, transactions may include creating and implementing a store/entity map that includes on demand, up-to-date unit/product information. In still a further embodiment, transactions may include a combination of the above. In a retail environment, the transactions may include value-added services, such as product availability, product delivery information, targeted advertising, customer purchasing histories, and related analyses and reporting options.

The exemplary embodiments are described herein, for illustrative purpose, with respect to business enterprises engaged in selling goods to customers (referred to as "end users"). A host system provides transaction services to one or more business enterprises under a licensing or service agreement. The business enterprises are referred to herein as "service provider entities" or "service provider systems." It will be understood, however, that the transaction services may be provided directly to the end users in lieu of, or in addition, to the business enterprises.

The transaction services automatically provide in-store shoppers with intelligent capabilities that enable purposeful shopping. The capabilities include the ability to upload item locations (e.g., floor level, department, aisle information, etc.), brand/price information for various products/services, and sales/promotion information on a personal device, such as a mobile telephone or personal digital assistant. The transaction services provide the ability to upload shopping lists stored on personal devices with location/price information, as well as store maps. These and other features of the transaction services are described further herein.

Figure 1:
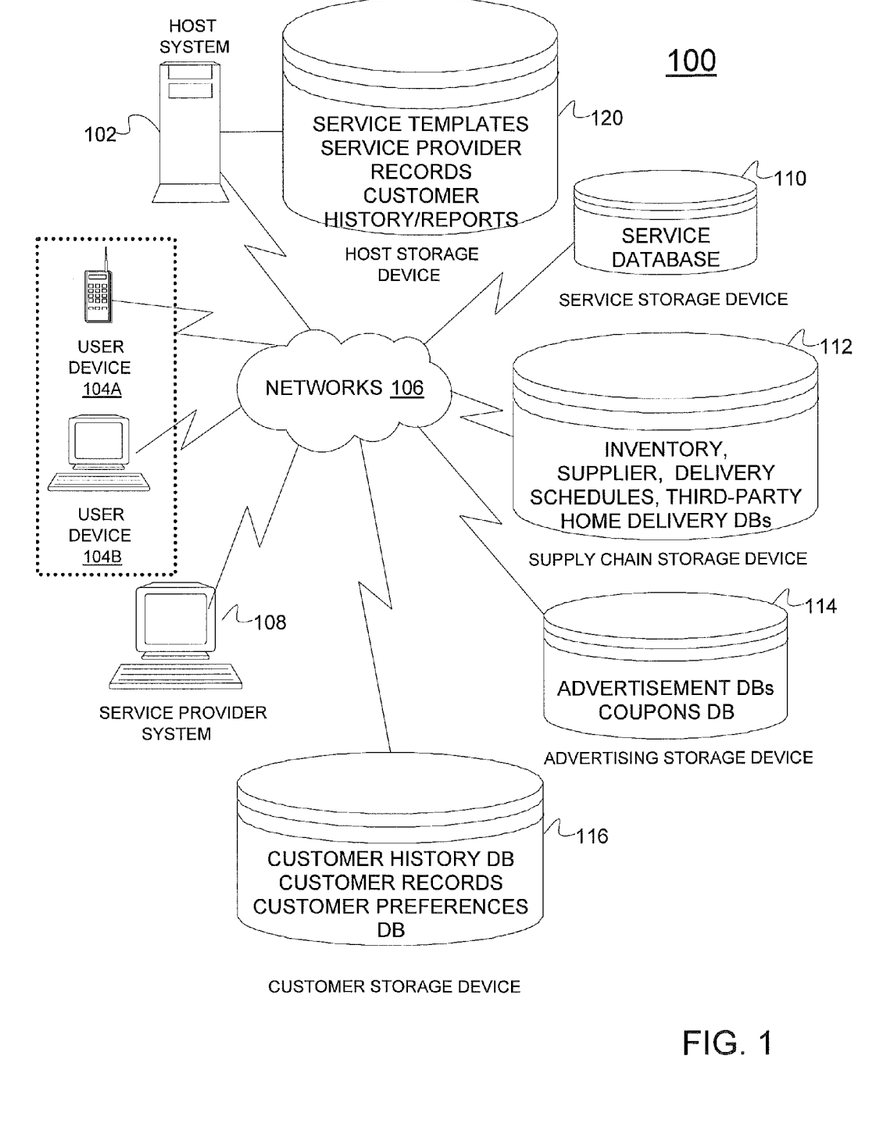
FIG. 1 illustrates an example of a system upon which transaction services may be implemented in accordance with an exemplary embodiment.

Turning now to FIG. 1, a system 100 upon which transaction services may be implemented will now be described in accordance with an exemplary embodiment.

The system 100 includes a host system 102 in communication with user devices 104A and 104B (collectively referred to herein as "user devices 104"), a service provider system 108, and storage devices 110, 112, 114, and 116 over networks 106.

As indicated above, the host system 102 may be implemented by an application service provider that provides the transaction services on behalf of an entity as a service to the entity. For example, in one embodiment, the host system 102 provides the transaction services as a free service to customers, or end users of user devices 104, and as a paid service offered to one or more entities (e.g., service provider system(s) 108). Alternatively, the host system 102 may be part of an enterprise (e.g., a commercial business) that implements the transaction services on its own operational and business data.

In an exemplary embodiment, the host system 102 executes computer instructions for implementing the transaction services as will be described herein. The host system 102 may comprise a high-speed computer processing device, such as a mainframe computer, to manage the volume of operations governed by an entity for which the transaction services activities are performed.

The system 100 includes the user devices 104 and the service provider systems 108 through which users at one or more geographic locations may contact the host system 102. User devices 104 and service provider systems 108 may include wireline or wireless communication devices, such as general-purpose computers, laptops, personal digital assistants, and/or cellular telephones, to name a few. If the user devices 104 and/or service provider systems 108 are personal computers, the processing described herein may be shared by user devices 104, service provider systems 108, and the host system 102 (e.g., by providing an applet to the user devices 104/service provider systems 108). User devices 104 and/or the service provider systems 108 may be operated by authorized users of the transaction services described herein.

In an exemplary embodiment, the user devices 104 execute a shopping application. The shopping application may include data fields for creating a shopping list (e.g., item name, quantity, price, brand, item location, and sale information). The shopping application may be any software that implements commerce exchange schemas or standards that enable interaction, such as xCBL, which is an XML-based common business language to represent the cross-industry exchange of business documents such as product descriptions, purchase orders, invoices, and shipping schedules. Another standard is electronic data interchange (EDI). The shopping application may alternatively be software that implements proprietary data interchange formats, such as Remember the Milk™, iNeedStuff™, GroceryIQ™, Shopper™, and Red Laser™

If the host system 102 is an application service provider (ASP), the user devices 104 are customers of the service provider system 108 and are referred to herein as "end users" to distinguish them from the service provider systems, which are customers of the host system 102 in this embodiment. Alternatively, user devices 104 may be direct customers of the host system 102 (e.g., not through the service provider systems 108).

The service provider system 108 may be a retail establishment or a seller of goods and/or services. In one embodiment, the service provider system 108 may include a brick-and-mortar establishment having a computer-implemented kiosk storing transaction service-related information, such as data pertaining to products, sales, availability, and locations of product items within the establishment. In this manner, an end user may acquire the information stored in the kiosk either remotely through a user device (e.g., user device 104A), which communicates with the kiosk wirelessly (e.g., using short range over-the-air protocols, such as WiFi, OBEX, and Bluetooth™), satellite protocols, such as global positioning, or wireline techniques (e.g., by physically connecting the user device 104A via a USB cable). Once the user device 104A is in proximity of the kiosk, the user device 104A detects or is detected by the kiosk, and updated product information is transmitted to the user device 104A from the kiosk. In another embodiment, the end user may access a website over networks 106 and download this information to the user device 104B and/or user device 104A.

The user device 104A may be a wireless mobile device, such as a cellular telephone or personal digital assistant. The user device 104B may be a wireless or wireline device, such as a personal computer or laptop.

While the system 100 of FIG. 1 illustrates two user devices 104A and 104B and one service provider system 108, it will be understood that any number of user devices and service provider systems may be employed in order to realize the advantages of the exemplary embodiments.

A user device 104 and/or service provider system 108 may be coupled to the host system 102 through multiple networks 106 (e.g., intranet and Internet) so that not all user devices 104 and service provider systems 108 are coupled to the host system 102 through the same network. One or more of the user devices 104, service provider systems 108, and the host system 102 may be connected to the networks 106 in a wireless fashion. In one embodiment, the networks 106 include an intranet and one or more user devices 104 and/or service provider systems 108 execute a user interface application (e.g. a web browser) to contact the host system 102 through the networks 106. Additionally, the networks 106 may include circuit-switched and/or packet-switched technologies and devices, such as routers, switches, hubs, gateways, etc., for facilitating communications. The networks 106 may include wireline and/or wireless components utilizing, e.g., IEEE 802.11 standards for providing over-the-air transmissions of communications.

The networks 106 may be implemented in a wireless fashion, e.g., using wireless protocols and technologies, such as WiFi, WiMax, Bluetooth™, GPS, etc. The networks 106 may include a cellular communications network, a fixed wireless network, a wireless local area network (LAN), a wireless wide area network (WAN), a personal area network (PAN), a virtual private network (VPN), an intranet or any other suitable network, and the networks 106 may include equipment for receiving and transmitting signals, such as a cell tower, a mobile switching center, a base station, and a wireless access point.

Also shown in FIG. 1 is a host storage device 120 in communication with the host system 102. The host storage device 120 includes a data repository with one or more databases for facilitating the transaction services functions. The databases may include e.g., service templates, service provider system records, customer history records, reports, and related information as described further herein. The storage device 120, as well as storage devices 110, 112, 114, and 116, is logically addressable as a consolidated data source across a distributed environment that includes networks 106. Information stored in the storage devices 110, 112, 114, 116, and 120 may be retrieved and manipulated via the host system 102 and alternatively, via the host system 102, the user devices 104, and/or the service provider systems 108.

In an exemplary embodiment, the service storage device 110 stores templates used by the transaction services. For example, the service storage device 110 stores a transaction service template and a map template. These templates are shown and described further herein.

In an exemplary embodiment, the supply chain storage device 112 stores inventory data and related availability information, shipping schedules, and supplier information. The transaction services utilize the supply chain storage device 112 in implementing an availability service (see service 306 of FIG. 3) and a delivery service (see service 308 of FIG. 3), which are value-added services provided by the transaction services.

In an exemplary embodiment, the advertising storage device 114 stores advertisements from service provider systems 108 and/or third party advertisement entities. The transaction services utilize the advertising storage device 114 to implement an advertising service (see service 310 of FIG. 3), which is a value-added service provided by transaction services.

In an exemplary embodiment, the customer storage device 116 stores customer (end user) purchasing histories and related sales data. The transaction services utilize the customer storage device 116 to implement a transaction analysis service (see service 312 of FIG. 3), which is a value-added service provided by transaction services.

The host system 102 depicted in the system 100 of FIG. 1 may be implemented using one or more servers operating in response to a computer program stored in a storage medium accessible by the server. The host system 102 may operate as a network server (e.g., a web server) to communicate with the user devices 104 and service provider systems 108. The host system 102 handles sending and receiving information to and from the client systems 104 and service provider systems 108 and can perform associated tasks. The host system 102 may also include a firewall to prevent unauthorized access to the host system 102 and enforce any limitations on authorized access. For instance, an administrator may have access to the entire system and have authority to modify portions of the system. A firewall may be implemented using conventional hardware and/or software as is known in the art.

The host system 102 may also operate as an application server. The host system 102 executes one or more computer programs to provide the transaction services functions. As indicated above, processing may be shared by the user devices 104, service provider systems 108, and the host system 102 by providing an application (e.g., java applet) to the user devices 104/service provider systems 108. Alternatively, the user devices 104 and/or service provider systems 108 may include a stand-alone software application for performing a portion or all of the processing described herein. As previously described, it is understood that separate servers may be utilized to implement the network server functions and the application server functions. Alternatively, the network server, the firewall, and the application server may be implemented by a single server executing computer programs to perform the requisite functions.

The system 100 implements transaction services as described herein. In an exemplary embodiment, the transaction services includes a user interface for enabling one or more users (e.g., individuals of user devices 104 and/or service provider systems 108) to enter data used by the transaction services, as well as receive data provided by the transaction services as described herein. Sample computer screen windows illustrating the user interface is shown and described in FIGS. 3-10.

Figure 2:
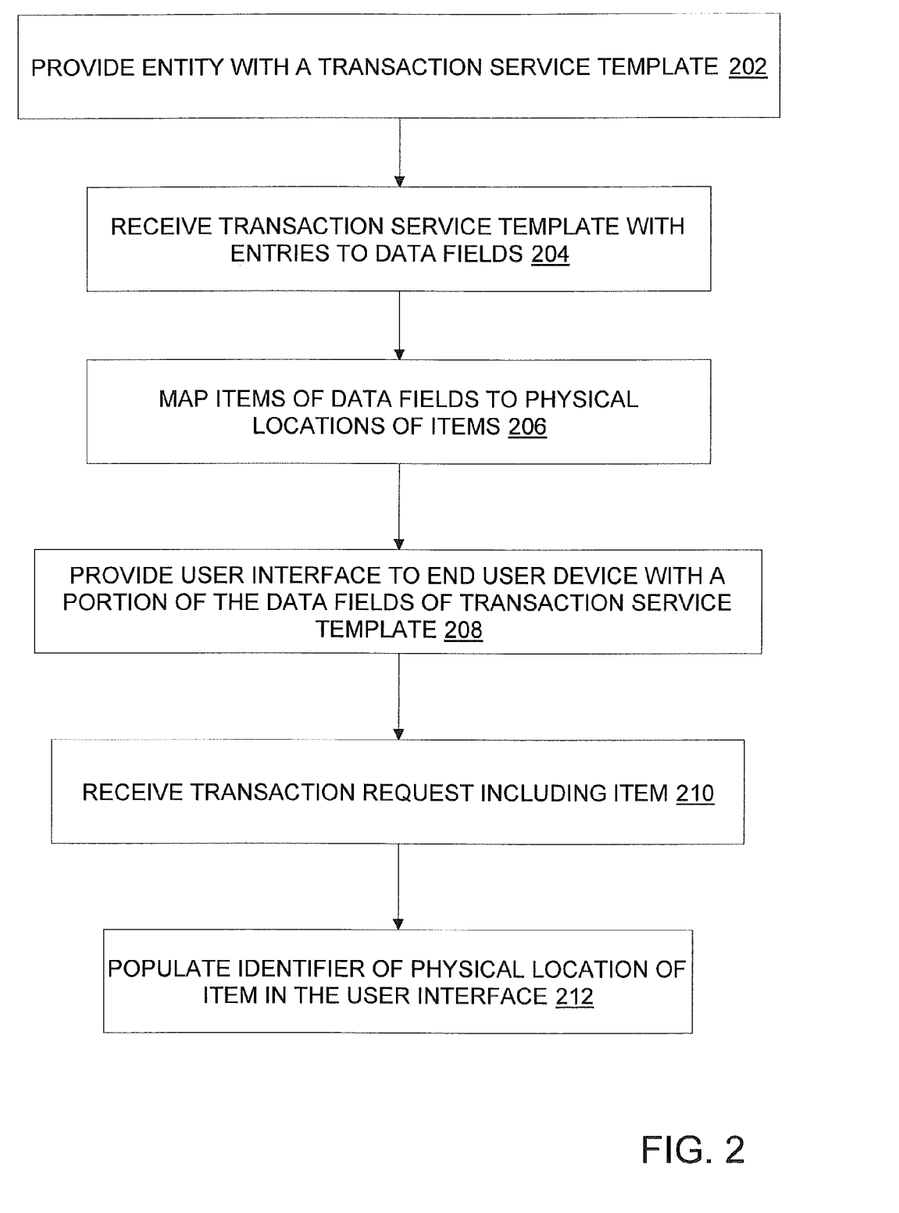
FIG. 2 illustrates a flow diagram describing a process for implementing the transaction services in accordance with exemplary embodiments.

FIG. 2 illustrates a flow diagram describing a process for implementing the transaction services, and FIGS. 3-10 illustrate user interface computer screen windows of the transaction services' user interface in accordance with exemplary embodiments. Turning now to FIGS. 2-10, an exemplary process and user interface computer screen windows of the transaction services will now be described.

Figure 3:
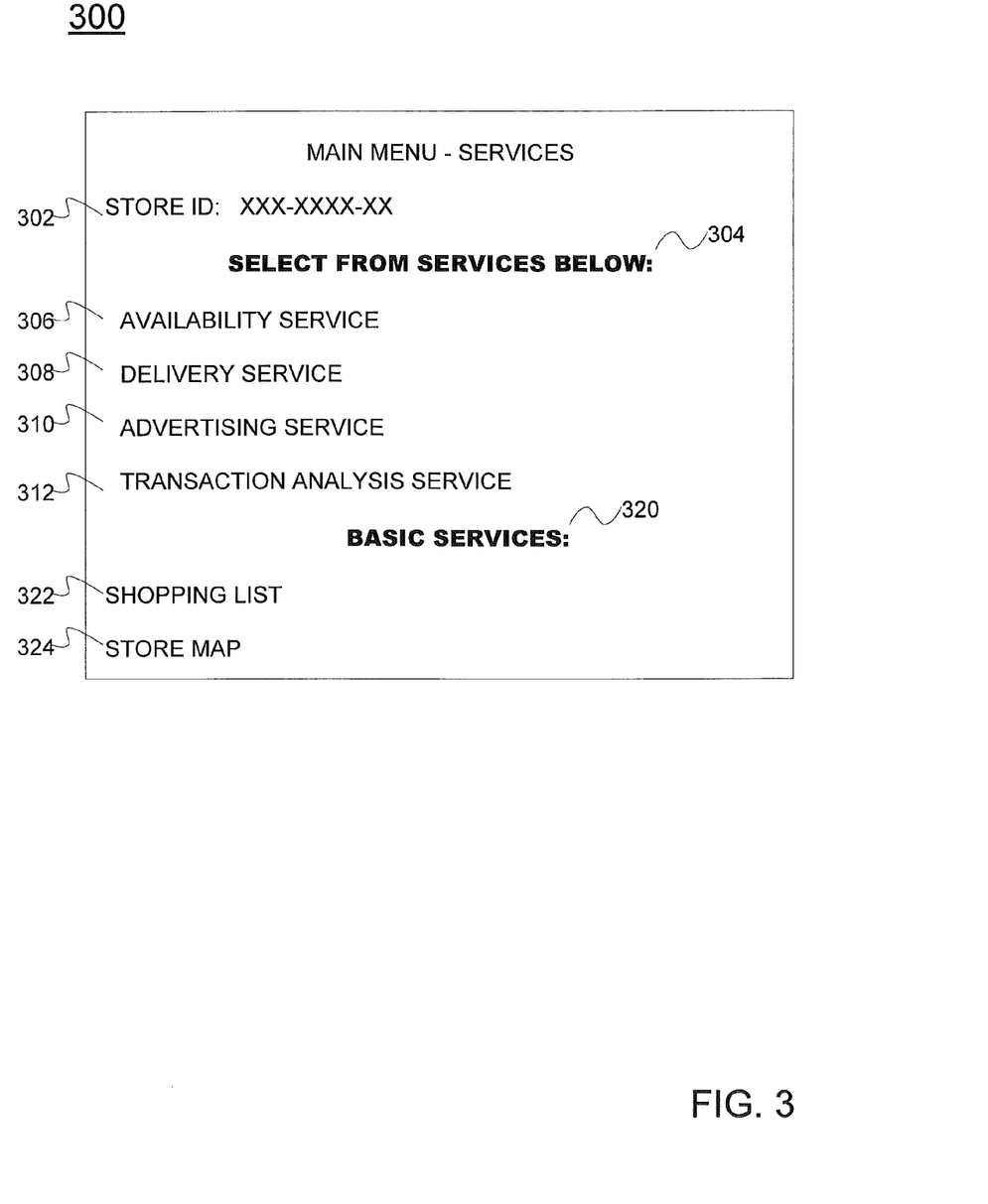
FIG. 3 illustrates a user interface computer screen window for initiating set up processes of the transaction services in accordance with exemplary embodiments.

The process described in FIG. 2 assumes that a user (e.g., a user of service provider entity 108) has accessed a website of the transaction services at the host system 102 and a main menu computer screen window 300 (FIG. 3) is presented to the service provider system 108. The host system 102 may uniquely identify the service provider system 108 using a unique identifier (shown as store ID 302 in user interface computer screen window 300). In one exemplary embodiment, the main menu computer screen window 300 displays basic services 320 and value added services 304, as shown in FIG. 3. The basic services 320 include a shopping list 322 service and a store map 324 service. The value-added services 320 include an availability service 306, a delivery service 308, an advertising service 310, and a transaction analysis service 312. For purposes of illustration, the process described in FIG. 2 also assumes that the user of service provider system 108 has selected the shopping list 322 service.

Figure 4:
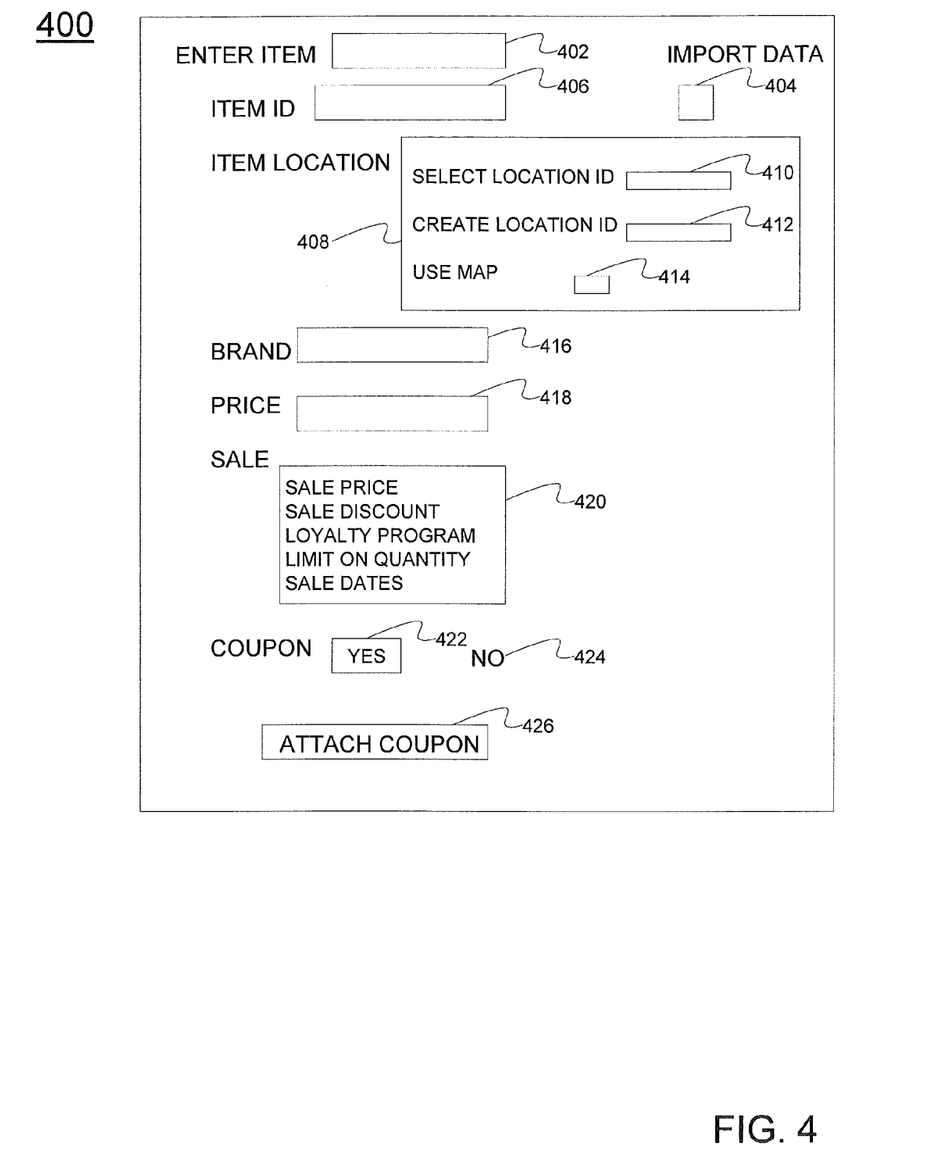
FIG. 4 illustrates a user interface computer screen window of a transaction service template in accordance with exemplary embodiments.
Figure 5:
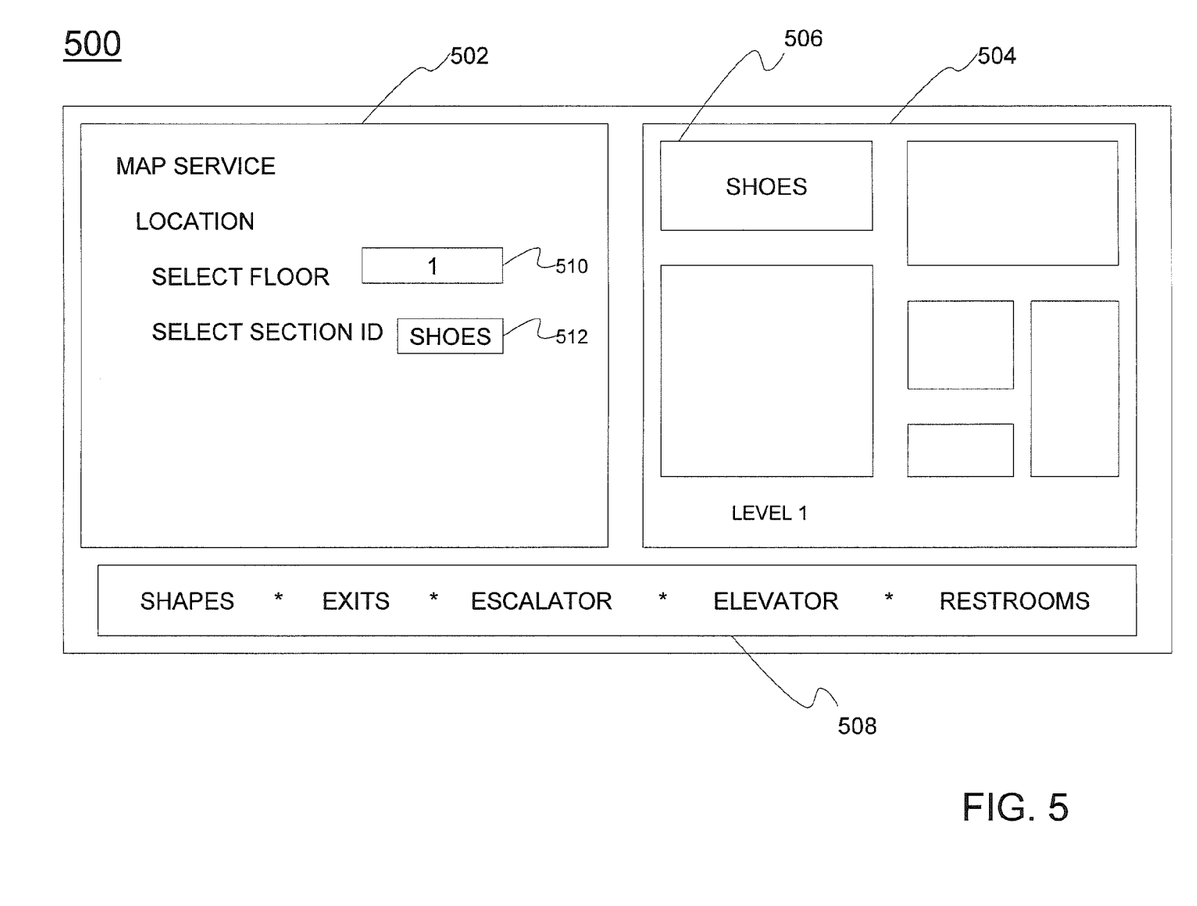
FIG. 5 illustrates a user interface computer screen window of a map template in accordance with exemplary embodiments.

At step 202, the host system 102 provides the service provider system 108 with a transaction service template 400, a sample of which is shown in FIG. 4. The transaction service template 400 enables the user to custom configure the shopping service 322 as desired by selecting from the options presented in the data fields shown therein. For example, if the service provider system 108 is a grocery retail establishment, the goods provided to customers include food items. Each item sold by the service provider system 108 may be entered using a data field 402. In addition, or alternatively, the item may be identified by a unique item identifier in data field 406 (e.g., a bar code). In one exemplary embodiment, the transaction services logic may be linked to the service provider system's 108 data warehouse, inventory, and/or business databases, such that some of the item information can be imported (e.g., by selecting an import data 404 function).

The transaction service template 400 also includes an item location window 408 that enables the user to specify a physical location of the service provider system's 108 establishment in which the item is stored. In an exemplary embodiment, this location represents the physical location in which a customer would find the item when shopping in the establishment. Physical locations may be identified by various categories, such as floor level (in a multi-level establishment), department (in a multi-department establishment), and by aisle number or ID. As shown in the window 408, the user may select an existing (e.g., pre-configured) location in a data field 410, enter a new location (e.g., user-defined) in a data field 412 or, if a store map has been previously generated, the user may select the a use map data field 414 to identify a location of an item using pre-defined data from the store map. The store map feature is described further herein.

Other item information that may be configured by the user of service provider system 108 include a brand name of the item (via data field 416), a price set for the item (via data field 418), a sale price of the item (i.e., a temporary reduced price via window 420, and a coupon for the item that causes the transaction services to associate or map the item to a store or manufacturer coupon via data fields 422/424. In one embodiment, the transaction services enable the user to attach an electronically stored coupon to the item, e.g., via the item name (data field 402) or item identifier (data field 404). The sale price in window 420 may be configured using a variety of techniques, each selectable by the user, such as specifying a sale price, a discount percentage, a loyalty program discount or sale, restrictions on quantity offered at a sale price, and the parameters of the sale (e.g., beginning/ending dates).

Once this information is completed for each of the items offered by the service provider system 108, the entries are transmitted to the host system 102. The host system 102 receives the entries in the transaction service template 300 at step 204, maps the entered items to corresponding physical locations at step 206, and stores the results, e.g., in the host storage system 110. As indicated above, this information may be stored at a kiosk of the service provider system 108 and accessible to customers (end users) of user devices 104.

An end user (e.g., via a user device 104) may use the shopping application executing on the user device 104 to enter a shopping list (e.g., items and quantities). When the user enters the establishment of the service provider system 108, the user device 104 connects with the storage device 110 (or kiosk) of the service provider system 108 to receive the price, sale, discount, and/or location information of the items on the shopping list. This process is referred to as a transaction request.

Figure 6:
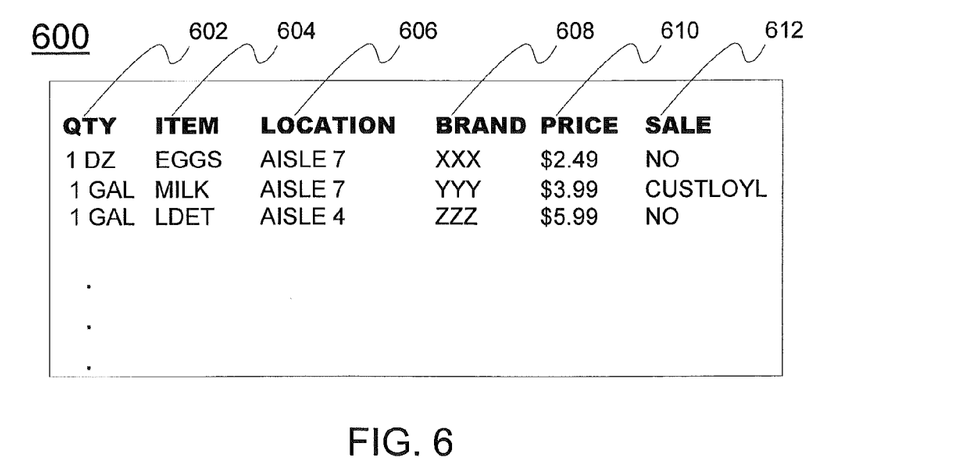
FIG. 6 illustrates a user interface computer screen window of a completed shopping list of an end user of the transaction services in accordance with exemplary embodiments.

When the user device 104 connects to the storage device 110, the transaction services receive the transaction request at step 210, retrieve the items entered in the item column of the user device's shopping application, look up these items in the storage device 110 via the transaction service template 400, and identify the available information for these items. Depending upon the services selected by the service provider entity 108 (e.g., shopping list 322, store map 324, and any of the value-added services 320), the transaction services provide detailed information to the end user according to the services selected. For example, the availability service 306 may provide up-to-date availability (e.g., in stock or expected in-stock dates) of products offered by the service provider system 108. This may be presented in a column in the shopping list on the user device 104. A sample shopping list is shown in a computer screen window 600 of FIG. 6. The availability service 306 may be implemented by providing a link from the transaction services to an inventory database or data warehouse (e.g., storage device 112 of FIG. 1) of the service provider system 108. As shown in FIG. 6 (e.g., via the absence of an availability column), the service provider system 108 has not selected the availability service 306 as an option.

In a further example, the delivery service 308 provides expected or actual delivery dates of items should the end user purchase out-of-stock items during the shopping experience at the enterprise. This may be presented in a column in the shopping list on the user device 104 (e.g., via the shopping list shown in computer screen window 600 of FIG. 6). The delivery service 308 may be implemented by providing a link from the transaction services to a delivery scheduling database (either local to the service provider system 108 or accessed via a third-party delivery entity (e.g., storage device 112 of FIG. 1) of the service provider system 108. As shown in FIG. 6 (e.g., via the absence of an availability column), the service provider system 108 has not selected the delivery service 306 as an option.

At step 212, the transaction services populate the columns in the shopping list with the location information of the items, as well as any other available data. As shown in the shopping list computer screen window 600 of FIG. 6, a quantity column 602 displays a quantity of an item input by the end user, an item column 604 displays the item entered by the end user, and a location column 606 displays a physical location of the item at the establishment of the service provider system 108. Also shown in the shopping list computer screen window 600, a brand column 608 displays the brand name of the item entered by the end user, a price column 610 displays the regular or list price of the item entered by the end user, and a sale column 612 enters any applicable sale information for the item.

As indicated above, the transaction services also include a store map service (depicted as store map 324 in FIG. 3). The store map service enables the service provider system 108 to generate a graphical (visual) display of the physical layout of the establishment via the transaction services. The transaction services of the host system 102 provide the service provider system 108 with a map template in response to the service provider system 108 selecting the store map 324 service from the main menu computer screen window 300 of FIG. 3. A sample map template 500 is shown and described in FIG. 5.

In an exemplary embodiment, the map template 500 includes a map service window 502 and a map outline window 504. The service provider defines the components of the store map by enter data into data fields presented in the map service window 502. As shown, e.g., in FIG. 5, the service provider enters the floor level to be defined in data field 510, followed by a store section defined in data field 512 (illustrated as a shoe department). The map template 500 includes a tool bar 508 that displays selectable options for customizing the store map. As shown in the tool bar 508, a shapes option enables the service provider to select a shape to identify the physical boundaries of a department, section, aisle or other category of the store. As an example, the service provider has selected a shape 506 to represent the shoes department and has placed the shape 506 in the top left hand corner of the map outline. Other tool bar options may include items for defining the layout of the establishment, such as store exits, escalators/elevators, and restrooms.

Figure 8A:
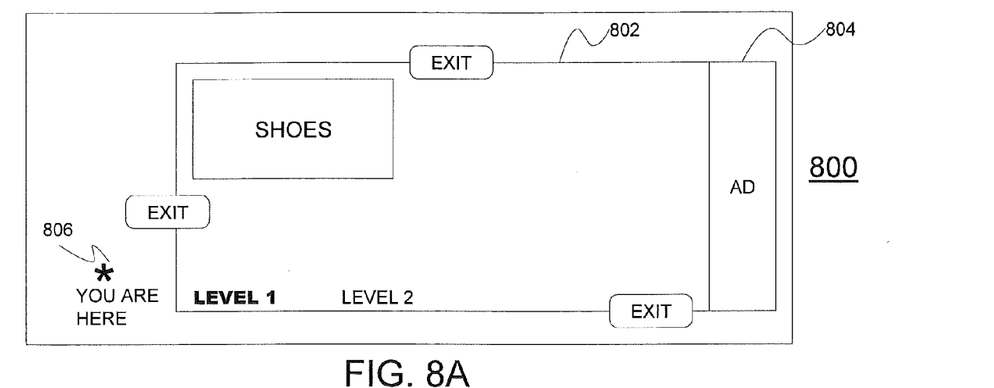
FIG. 8A illustrates a user interface computer screen window of a store map created via the transaction services in accordance with exemplary embodiments.
Figure 8B:
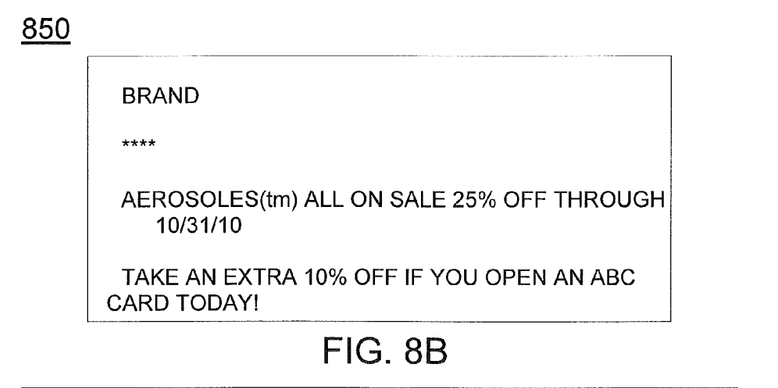
FIG. 8B illustrates a user interface computer screen window of store sale information resulting from selection of an item on the store map created in FIG. 8A in accordance with an exemplary embodiment.
Figure 8C:
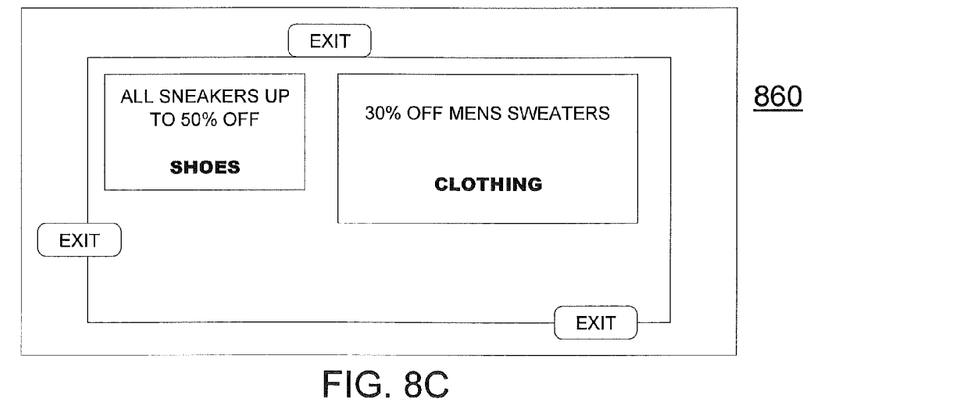
FIG. 8C illustrates a user interface computer screen window of the store map of FIG. 8A including store sale information in accordance with exemplary embodiments.

In an exemplary embodiment, the data fields provided in map service window 502 may be mapped to one or more data fields in the transaction service template 400 such that product, sale, discount, coupon, etc., information may be identified by the map template 500 and populated in the relevant sections of the store map shown in map outline window 504 and finished store map (see, e.g., FIGS. 8B and 8C).

Figure 7:
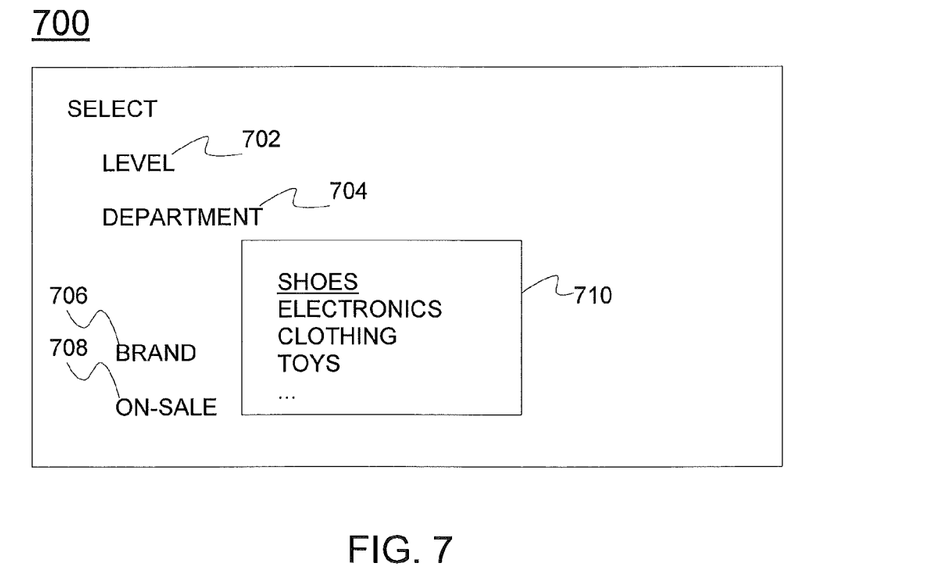
FIG. 7 illustrates a user interface computer screen window of a store menu created via the transaction services in accordance with exemplary embodiments.

Once the information has been entered in the map template 500, an end user may access a resulting store map from, e.g., any of the user devices 104A and 104B. As shown in FIG. 7, an end user enters the establishment of the service provider system 108 and connects with the storage device 110. A store menu screen 700 is displayed to the end user with selectable options. The options enable the end user to select from a store level (option 702), a department (option 704), a store brand (option 706), and on-sale items (option 708). If the end user selects the department option 704, a window 710 is presented with a listing of available departments within the establishment. The user may select a department from the window 710, and a store map including the selected department is presented to the user, as shown in FIG. 8A. The store map 802 is presented in a computer screen window 800 that also includes an advertisement window 804. For example, if the service provider system 108 selected the advertising service 310 shown in FIG. 3, a store advertisement, coupon, or third-party advertisement may be displayed in the window 804. If the user device is equipped with GPS, the transaction services may also provide a tag or indicator 806 of the end user's location, such that the end user may perceive his/her location in reference to the location of the desired department in the establishment. The transaction services may provide sale information about its products via the store map service 324. For example, in one embodiment, the transaction services may be configured, such that an end user clicks on a shape (e.g., shape 506) on a store map and the transaction services displays products on sale within the department, section, or aisle identified by the shape. As shown in FIG. 8A, the selected department is the shoe department. By clicking on the shape, the end user is presented with a window 850 of FIG. 8B that provides sale items and related sale information. In addition, other information may be provided as well, such as offers to open a store credit card. In yet a further embodiment, the transaction services may be configured such that the end user selects a floor level or other identifier and the store map displays all sales of items on that particular floor level (as shown, e.g., in a computer screen window 860 of FIG. 8C).

Figure 9:
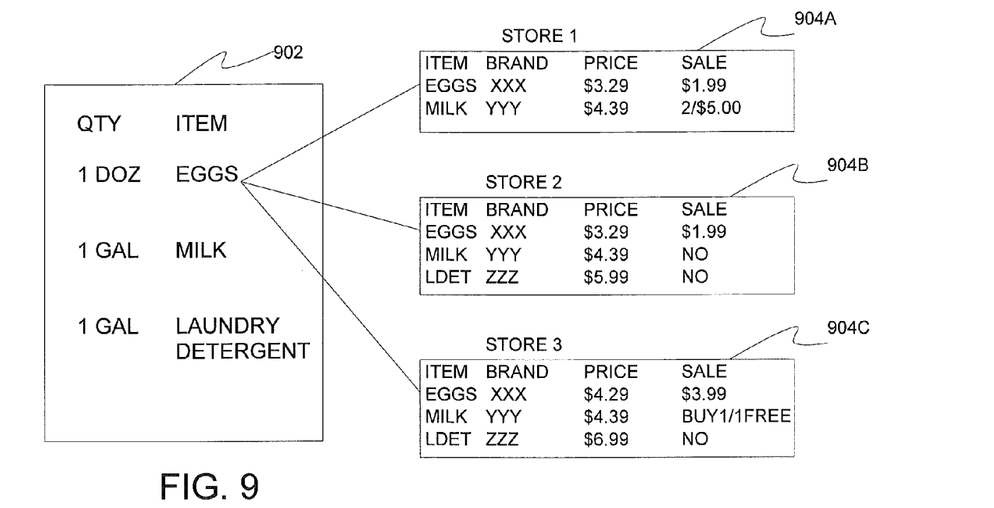
FIG. 9 illustrates an end user shopping list and mappings to store information in accordance with an exemplary embodiment.
Figure 10:
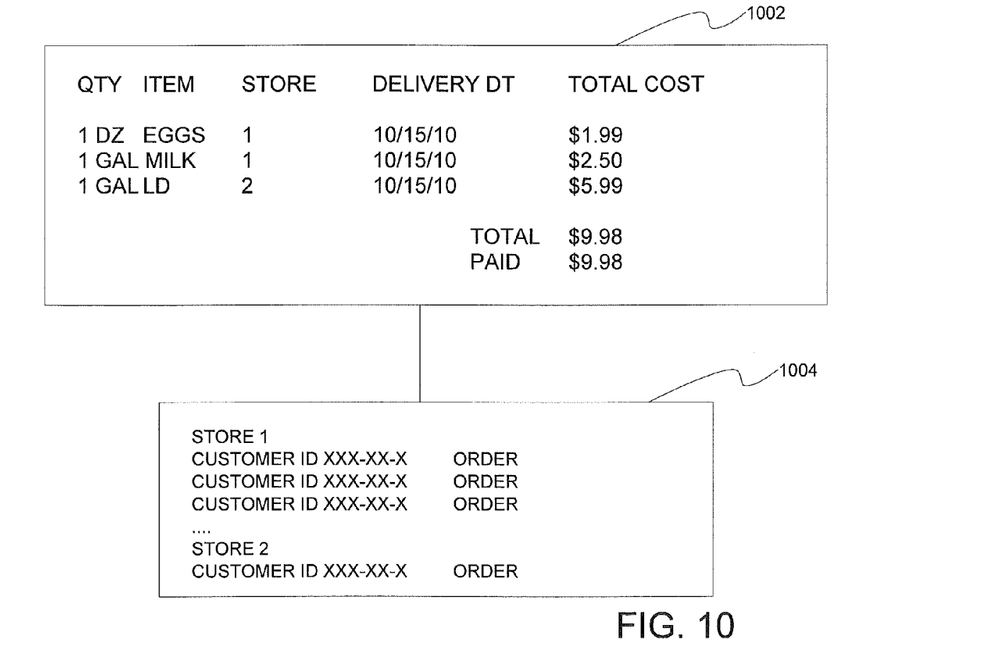
FIG. 10 illustrates a purchase order for stores participating in the transaction services and a sample invoice generated by the transaction services for the shopping list of FIG. 9 in an exemplary embodiment.

In additional exemplary embodiments, the transaction services may provide value-added services directly to the end users, as indicated above. For example, the transaction services may utilize a shopping list entered by the end user to search storage device 110 or storage devices of service provider systems to which it has access, and identify the best sale prices from each service provider system 108. Other criteria may also be searched, such as the service provider systems 108 within the closest proximity to the end user or the end user's residence. For example, the transaction services searches items entered by the end user in its storage device 110 provided by multiple service provider systems 108 and compares prices of the items, and/or locations of the service provider systems 108 that carry the items. The transaction services may be configured to apply business rules to the data to determine which service provider systems 108 should be selected to provide the items in the shopping list. A sample shopping list 902 is shown in FIG. 9. In addition, sample databases 904A, 904B, and 904C of different service provider systems (i.e., Store 1, Store 2, and Store 3) are illustrated. The transaction services processes the shopping list items in view of the databases 904A-904C and generates an invoice for the end user with the selected items, whereby the items are purchased from multiple service provider systems. A sample invoice 1002 is shown in FIG. 10. The transaction services may then generate a purchase order for the items, as well as for items from other end users, which are aggregated by service provider system and transmitted to the appropriate service provider system. A sample purchase order 1004 is shown in FIG. 10. In one exemplary embodiment, the transaction services may be configured to provide automated delivery of goods purchased via the shopping list 902 and database analyses described above. For example customer records and service provider records may be maintained by the host system (e.g., stored in host storage device 120) and used to identify customers and service providers for arranging delivery options.

In a further exemplary embodiment, the transaction services may be configured to provide transaction analysis services 312 as indicated above. By tracking customer spending habits and histories, as well as sales, promotions, and advertising provided by the service provider systems 108, the host system 102 may provide detailed analysis and reporting of various points of interest, such as the success of sales campaigns, the effectiveness of the value-added services in view of the total sales of a service provider system, and other reporting features.

In a further exemplary embodiment, the transaction services may be used to leverage home automation functionality in order to automatically generate a shopping list or service list and to invite bidding from various service providers and sellers. For example, when a car is parked in a garage, the transaction services may be configured to automatically generate an alert when the oil level in the car reaches a predetermined threshold. This alert information may be automatically transmitted to various car repair or service shops in the area and the shops may then bid on the service. In other example, a refrigerator detects a compressor problem within and automatically generates an alert that is transmitted to electrical service providers in the area, inviting the electrical service providers to bid on the repair job. In another example, the transaction services are configured to communicate with a refrigerator to automatically create a shopping list based upon items that have been depleted and/or are regularly purchased. The shopping list may then be automatically distributed electronically to food sellers in the area inviting them to bid on providing the items on the shopping list. In alternative exemplary embodiments, the transaction services may be configured to collaborate with social network providers to provide value added services to their subscribers.

As described above, the exemplary embodiments can be in the form of computer-implemented processes and apparatus for practicing those processes. The exemplary embodiments can also be in the form of computer program code containing instructions embodied in tangible media, such as floppy diskettes, CD ROMs, hard drives, or any other computer-readable storage medium, wherein, when the computer program code is loaded into and executed by a computer, the computer becomes an apparatus for practicing the exemplary embodiments. The exemplary embodiments can also be in the form of computer program code, for example, whether stored in a storage medium, loaded into and/or executed by a computer, or transmitted over some transmission medium, loaded into and/or executed by a computer, or transmitted over some transmission medium, such as over electrical wiring or cabling, through fiber optics, or via electromagnetic radiation, wherein, when the computer program code is loaded into an executed by a computer, the computer becomes an apparatus for practicing the exemplary embodiments. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed for carrying out this invention, but that the invention will include all embodiments falling within the scope of the claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A method for providing transaction services, comprising:
   receiving, at a computer processor device of an entity via a first user interface, a transaction service template having data fields configured to specify items and identifiers of physical locations in which each of the items resides, the transaction service template including entries presented in the data fields, the transaction service template mapping the items to corresponding physical locations;
   providing, via the computer processor device, a second user interface to an end user device, the second user interface including a portion of the data fields of the transaction service template;
   using a global positioning system of the end user device to determine a physical location of the end user device;
   in response to a transaction request that includes one of the items, populating an identifier of a corresponding physical location of the one of the items in the transaction request within the second user interface and providing for display a tag on the end user device indicative of a relative location of the end user device with respect to a physical establishment of the entity as a transaction response; and
   monitoring a status of the items, and distributing an offer to bid on addressing needs identified for the items based on results of the monitoring.

2. The method of claim 1, wherein the entity is a seller, the items are goods offered by the seller, and the data fields of the first user interface include an item identifier and an item price.

3. The method of claim 2, wherein the identifiers of physical locations specify:
   an aisle of the establishment of the seller;
   a department of the establishment of the seller; and
   a floor level of the establishment of the seller.

4. The method of claim 2, wherein the data fields of the first user interface further include:
   a brand of the items;
   a sale price of the items;
   a discount offered for the items; and
   a coupon offered for the items.

5. The method of claim 1, wherein the status relates to product inventory associated with the items.

6. The method of claim 1, wherein the items include operations equipment of the entity, and the status relates to an operational condition of the operations equipment.

7. The method of claim 1, further comprising:
   providing, to the entity via a third user interface, a map template having data fields and graphical design objects configured to generate a map depicting a visual representation of a design layout for the physical establishment of the entity;
   receiving the map template including entries presented in the data fields, the map template mapping the entries to selected graphical design objects;
   providing a fourth user interface to the end user device, the fourth user interface including a portion of the data fields in the map template; and
   in response to another transaction request that includes one of the entries, generating a map including the design layout populated with the selected graphical design objects and corresponding one of the entries as a second transaction response.

8. The method of claim 1, wherein the transaction service template further includes data fields configured to define features of a delivery service, the delivery service including:
   in response to the transaction request that includes one of the items:
   retrieving transaction service templates having entries in data fields matching the one of the items, the transaction service templates received from multiple entities;
   applying pre-defined rules to the transaction service templates;
   selecting one of the entities to provide the one of the items based upon application of the pre-defined rules to the transaction service templates; and
   generating a purchase order for the one of the items.

9. A system for providing transaction services, comprising:
   a host system computer; and
   logic executing on the host system computer, the logic implementing a method comprising:
   receiving at an entity via a first user interface, a transaction service template having data fields configured to specify items and identifiers of physical locations in which each of the items resides, the transaction service template including entries presented in the data fields, the transaction service template mapping the items to corresponding physical locations;
   providing a second user interface to an end user device, the second user interface including a portion of the data fields of the transaction service template;
   using a global positioning system location of the end user device to determine a physical location of the end user device;
   in response to a transaction request that includes one of the items, populating an identifier of a corresponding physical location of the one of the items in the transaction request within the second user interface and providing for display a tag on the end user device indicative of a relative location of the end user device with respect to a physical establishment of the entity as a transaction response; and
   monitoring a status of the items, and distributing an offer to bid on addressing needs identified for the items based on results of the monitoring.

10. The system of claim 9, wherein the entity is a seller, the items are goods offered by the seller, and the data fields of the first user interface include an item identifier and an item price.

11. The system of claim 10, wherein the identifiers of physical locations specify:
    an aisle of the establishment of the seller;
    a department of the establishment of the seller; and
    a floor level of the establishment of the seller.

12. The system of claim 10, wherein the data fields of the first user interface further include:
- a brand of the items;
- a sale price of the items;
- a discount offered for the items; and
- a coupon offered for the items.

13. The system of claim 9, wherein the status relates to product inventory associated with the items.

14. The system of claim 9, wherein the items include operations equipment of the entity, and the status relates to an operational condition of the operations equipment.

15. The system of claim 9, wherein the method further comprises:
- providing, to the entity via a third user interface, a map template having data fields and graphical design objects configured to generate a map depicting a visual representation of a design layout for the physical establishment of the entity;
- receiving the map template including entries presented in the data fields, the map template mapping the entries to selected graphical design objects;
- providing a fourth user interface to the end user device, the fourth user interface including a portion of the data fields in the map template; and
- in response to another transaction request that includes one of the entries, generating a map including the design layout populated with the selected graphical design objects and corresponding one of the entries as a second transaction response.

16. The system of claim 9, wherein the transaction service template further includes data fields configured to define features of a delivery service, the delivery service including:
- in response to the transaction request that includes one of the items:
- retrieving transaction service templates having entries in data fields matching the one of the items, the transaction service templates received from multiple entities;
- applying pre-defined rules to the transaction service templates;
- selecting one of the entities to provide the one of the items based upon application of the pre-defined rules to the transaction service templates; and
- generating a purchase order for the one of the items.

17. A computer program product for providing transaction services, the computer program product comprising a non-transitory computer-readable storage medium having instructions embodied thereon, which when executed by a computer cause the computer to implement a method, the method comprising:
- receiving, at an entity via a first user interface, a transaction service template having data fields configured to specify items and identifiers of physical locations in which each of the items resides, the transaction service template including entries presented in the data fields, the transaction service template mapping the items to corresponding physical locations;
- providing a second user interface to an end user device, the second user interface including a portion of the data fields of the transaction service template;
- using a global positioning system location of the end user device to determine a physical location of the end user device;
- in response to a transaction request that includes one of the items, populating an identifier of a corresponding physical location of the one of the items in the transaction request within the second user interface and providing for display a tag on the end user device indicative of a relative location of the end user device with respect to a physical establishment of the entity as a transaction response; and
- monitoring a status of the items, and distributing an offer to bid on addressing needs identified for the items based on results of the monitoring.

18. The computer program product of claim 17, wherein the entity is a seller, the items are goods offered by the seller, and the data fields of the first user interface include an item identifier and an item price.

19. The computer program product of claim 17, wherein the method further comprises:
- providing, to the entity via a third user interface, a map template having data fields and graphical design objects configured to generate a map depicting a visual representation of a design layout for the physical establishment of the entity;
- receiving the map template including entries presented in the data fields, the map template mapping the entries to selected graphical design objects;
- providing a fourth user interface to the end user device, the fourth user interface including a portion of the data fields in the map template; and
- in response to another transaction request that includes one of the entries, generating a map including the design layout populated with the selected graphical design objects and corresponding one of the entries as a second transaction response.

20. The computer program product of claim 17, wherein the transaction service template further includes data fields configured to define features of a delivery service, the delivery service including:
- in response to the transaction request that includes one of the items:
- retrieving transaction service templates having entries in data fields matching the one of the items, the transaction service templates received from multiple entities;
- applying pre-defined rules to the transaction service templates;
- selecting one of the entities to provide the one of the items based upon application of the pre-defined rules to the transaction service templates; and
- generating a purchase order for the one of the items.

* * * * *